US006633025B2

(12) United States Patent
Youn

(10) Patent No.: US 6,633,025 B2
(45) Date of Patent: Oct. 14, 2003

(54) METHOD AND APPARATUS FOR DETECTING AND COMPENSATING INCLINATION OF OBJECTIVE LENS

(75) Inventor: Jeong Chae Youn, Pyungtaek (KR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 09/800,922

(22) Filed: Mar. 8, 2001

(65) Prior Publication Data

US 2001/0020674 A1 Sep. 13, 2001

(30) Foreign Application Priority Data

Mar. 8, 2000 (KR) ........................................ 2000-11502

(51) Int. Cl.[7] ................................................. G11B 7/00
(52) U.S. Cl. .................................. 250/201.5; 369/44.29
(58) Field of Search .................... 250/201.5; 364/44.28, 364/44.29, 44.32, 53.19, 53.34

(56) References Cited

U.S. PATENT DOCUMENTS 5,886,962 A * 3/1999 Takamine et al. ........ 369/44.32
6,339,565 B1 * 1/2002 Zhao ....................... 369/44.28

* cited by examiner

*Primary Examiner*—Scott J. Sugarman
*Assistant Examiner*—Richard Hanig
(74) *Attorney, Agent, or Firm*—Birch, Stewart, Kolasch & Birch, LLP

(57) ABSTRACT

A method for detecting and compensating inclination of an objective lens includes the steps of: initially driving an optical disk and detecting a record signal while travelling on the track of the optical disk; checking whether a GFS signal according to the rotation of the optical disk is normally detected; checking a center error signal value outputted from the optical pick-up which reads a record data on the optical disk in case that the GFS signal is abnormally detected; and discriminating inclination of the objective lens on the basis of the checked center error signal value, thereby judging inclination of the objective lens quickly and accurately. In order to discriminate inclination of the objective lens by the optical disk driving apparatus, the GFS signal and the center error signal generated according to the rotation of the optical disk are all taken into consideration, so that the inclination of the objective lens in the optical pick-up is accurately and quickly discriminated. Thus, any malfunction caused due to the inclination of the objective lens can be restored within a short time (especially within 100 ms) to perform the normal operation.

19 Claims, 10 Drawing Sheets

METHOD AND APPARATUS FOR DETECTING AND COMPENSATING INCLINATION OF OBJECTIVE LENS

BACKGROUND OF THE INVENTION

1. Field of the Invention

The present invention relates to a method and apparatus for detecting and compensating inclination of an objective lens, and more particularly to a method and apparatus for detecting and compensating inclination of an objective lens that is capable of accurately discriminating inclination of an objective lens inside an optical pick-up caused due to an eccentricity of an optical disk and other factors and quickly coping with it.

2. Description of the Background Art

Generally, an optical disk driving apparatus reads a data recorded in an optical disk by means of an optical pick-up, processes the read signal and releases its compression, to thereby implement an image and an audio.

When a tracking and focussing servo operations are turned on, the optical pick-up beams laser on a predetermined position of the optical disk and picks up the reflected light to read a data.

When the data is read from the optical pick-up, a problem may arise that the objective lens of the optical pick-up is inclined from an optical axis to a side due to an eccentricity of the optical disk or other factors.

In order to solve the problem, a GFS (Good Frame Sync) signal is used in the optical disk driving apparatus.

When the rotation rate of the optical disk reaches a predetermined rate, a synchronous signal of a frame is detected at predetermined time intervals, that is, periodically. The GFS signal is a signal outputted as a high level in case that the periodically detected synchronous signal is as many as a predetermined number consecutively within a predetermined time, which is also utilized to check the eccentricity of the optical disk.

FIG. 1 illustrate wave forms indicating an center error signal and the GFS signal generated when the objective lens is stable, of which the first wave form indicates a sled compensation signal, the second wave form indicates a tracking servo signal, the third wave form indicates a center error signal and the fourth wave form indicates the GFS signal.

The center error signal is a signal to control the objective lens for axial center not to deviate when the track is searched, that is, when the optical pick-up jumps from the currently reproducing point to other point.

As shown in the center error signal wave form, when the objective lens continuously follows the track of the optical disk without inclination, the GFS signal maintains a high level.

FIG. 2 illustrates wave forms of a center error signal and a GFS signal generated when the objective lens is inclined to a side when the objective lens is switched from a reproduction operation to a searching operation or other factors such as a search due to a scratch or a dust of the disk. In this drawing, it is noted that the GFS signal is abnormally outputted.

FIG. 3 illustrates wave forms of signals according to the process that the objective lens returns to the optical axis. In this drawing, a controlling operation is performed to check the GFS signal of FIG. 2 and return the servo to its original state, but as soon as the servo returns to the original state, the lens is inclined again and a long time (a few seconds) is taken for the object lens to return to its original state.

As shown in the wave form of the center error signal, in case that the objective lens is inclined to one side, the center error signal is not constant, and the GFS signal is not normally outputted. With the GFS signal outputted as such, the objective lens is judged to be in an inclined state, according to a compensation operation is performed.

However, besides the case where the objective lens is inclined, there may occur that the GFS signal is not normally generated and is maintained at a low level.

That is, in case that the objective lens is inclined from the optical axis to a side, in case that the disk is not in a good state or in case that the speed of a spindle motor is not normally controlled, the GFS signal has the low value and the data reading from the optical disk is not normally performed.

Therefore, it is not possible to discriminate with the GFS signal whether it falls to the case that the objective lens is inclined or the disk is in a bad condition.

Thus, in the conventional art, if the GFS signal is not normally outputted, first, it is judged that the disk is in a bad condition, so that the optical pick-up is moved to a different position of the optical disk and performs data reading.

After the optical pick-up is moved, as shown in FIG. 3, if the GFS signal does not return to a high level signal, that is, if the lens does not return to the center and maintains the inclined state even through the optical pick-up is moved to a difference position and performs reading, it is judged that the objective lens has inclined, so that the spindle motor for rotatably driving the optical disk is stopped from driving and the processes are re-performed from the automatic focussing operation.

The center error signal are shown in FIG. 1 or 3 to indicate the degree of inclination of the center of the objective lens, which is not taken into consideration in case of normal reproducing operation in the conventional system, and which is illustrated to show characteristic of each signals.

The above processes will now be described with reference to FIG. 4.

FIG. 4 is a flow chart of the method for detecting inclination of an objective lens.

First, the optical disk is inserted (S10) and a tracking servo and a focus servo is turned on (S11). While the optical disk is being reproduced, it is checked whether the GFS signal is normally outputted (S12). When the GFS signal is normally outputted, that is, when the GFS signal is maintained at a high level, the optical disk keeps reproducing, while if the GFS signal is outputted as a low level signal for a predetermined time (T1) (S14), it is judged that the disk is in a bad condition, so that the optical pick-up is moved to a different position of the optical disk to read a data of the position (S17). If the low level signal is continuously detected (S16) for a predetermined time (T2) even after the optical pick-up is moved, it is judged that the objective lens has inclined from the optical axis to a side, so that the spindle motor is stopped and the processes are attempted again from the automatic focussing operation (S18).

However, the conventional art is disadvantageous in that in case that the objective lens has inclined from the optical axis to a side, only when the GFS signal is outputted as a low level signal for a predetermined time, the objective lens is judged to have inclined and operated, causing an unnecessary delay of time.

In addition, in the case that the lens has inclined to one side, even through the sled servo is compensated as far as the inclined distance, the lens may not return to the center.

SUMMARY OF THE INVENTION

Therefore, an object of the present invention is to provide a method for detecting inclination of an objective lens in which, in order to detect inclination of an objective lens inserted in an optical pick-up, inclination of an objective lens is quickly and accurately detected in consideration of a GFS signal and a center error signal generated by the rotation of an optical disk, thereby making a normal reproduction within a short time, and its apparatus.

Especially, in the method for detecting inclination of an objective lens of the present invention, the center error signal, which is generally used to control the center of the objective lens in searching a track, is utilized for a normal reproduction, thereby compensating inclination of the objective lens quickly.

To achieve these and other advantages and in accordance with the purpose of the present invention, as embodied and broadly described herein, there is provided a method for detecting inclination of an objective lens including the steps of: initially driving an optical disk and detecting a record signal while travelling on the track of the optical disk; checking whether a GFS signal according to the rotation of the optical disk is normally detected; checking a center error signal value outputted from the optical pick-up which reads a record data on the optical disk in case that the GFS signal is abnormally detected; and discriminating inclination of the objective lens on the basis of the checked center error signal value, thereby judging inclination of the objective lens quickly and accurately.

To achieve the above objects, there is also provided an apparatus for detecting inclination of an objective lens including: an optical pick-up for reading a data recorded on the optical disk; a spindle motor for rotating the optical disk; a sled motor for moving the optical pick-up horizontally; a drive unit for driving the spindle motor and the sled motor; a center error signal detector for detecting a center error signal from an output signal of a photodiode inserted in the optical pick-up; an A/D converter for converting the signal outputted from the center error signal detector to a digital signal; an RF unit for generating a servo error signal and a reproduction RF signal according to the signal read by the optical pick-up; a digital signal processor for outputting a reproduction data according to the signal outputted from the RF unit, controlling the drive unit and outputting a GFS signal; and a microcomputer for judging whether the objective lens inserted in the optical pick-up has inclined according to the GFS signal outputted from the digital signal processor and the center error signal outputted from the A/D converter, and accordingly performing a compensation operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
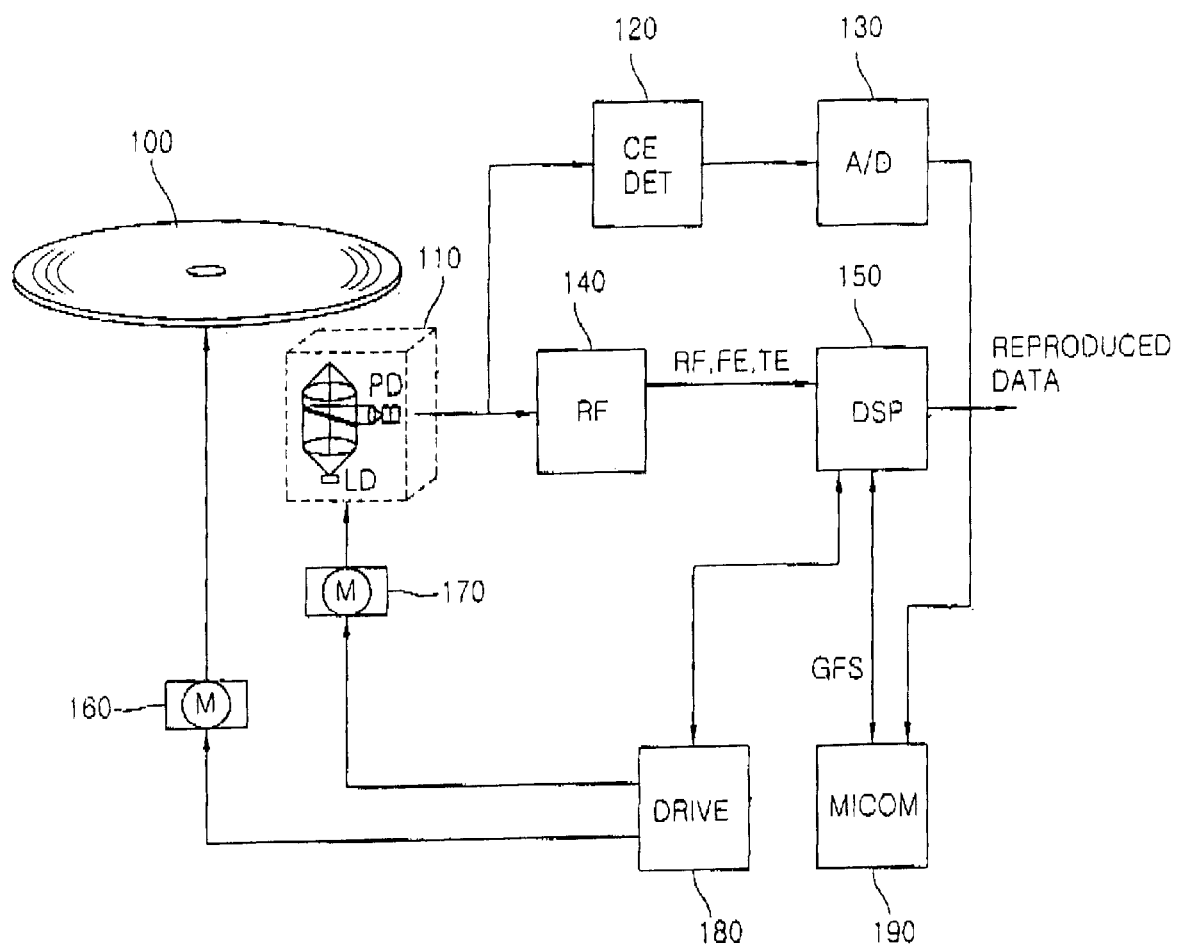
FIG. 5 is a schematic block diagram of an optical disk driving apparatus for detecting inclination of an objective lens in accordance with the present invention.

FIG. 5 is a schematic block diagram of an optical disk driving apparatus for detecting inclination of an objective lens in accordance with the present invention.

As shown in the drawing, the optical disk driving apparatus includes an optical disk 100 having more than two record layers, an optical pick-up 110 for reading a data recorded on the optical disk 100, a spindle motor 160 for rotating the optical disk, a sled motor 170 for horizontally moving the optical pick-up 110, a drive unit 180 for driving the spindle motor 160 and the sled motor 170, a center error signal detector 120 for detecting a center error (CE) signal from an output signal of a photodiode (PD) inserted in the optical pick-up 110, an A/D converter 130 for converting the signal outputted from the center error signal detector 120 to a digital signal, an RF unit 140 for generating servo error signals (TE, FE) and a reproduction RF signal according to the signal read from the optical pick-up 110, wave-shaping the generated reproduction RF signal and outputting it as a binary signal, a digital signal processor 150 for restoring the binary signal outputted from the RF unit 140 to a reproduction data according to a phase-locked clock of its own to output it, controlling driving of the drive unit 180 according to the outputted tracking error (TE) and the focus error (FE), and generating and outputting a GFS signal, and a microcomputer 190 for judging whether an objective lens inserted in the optical pick-up 110 has inclined according to the GFS signal outputted from the digital signal processor 150 and the digital value outputted from the A/D converter 130 and performs a compensation operation accordingly.

The operation of the optical disk driving apparatus constructed as described above will now be explained with reference to FIGS. 5, 6, 7 and 8.

Figure 7:
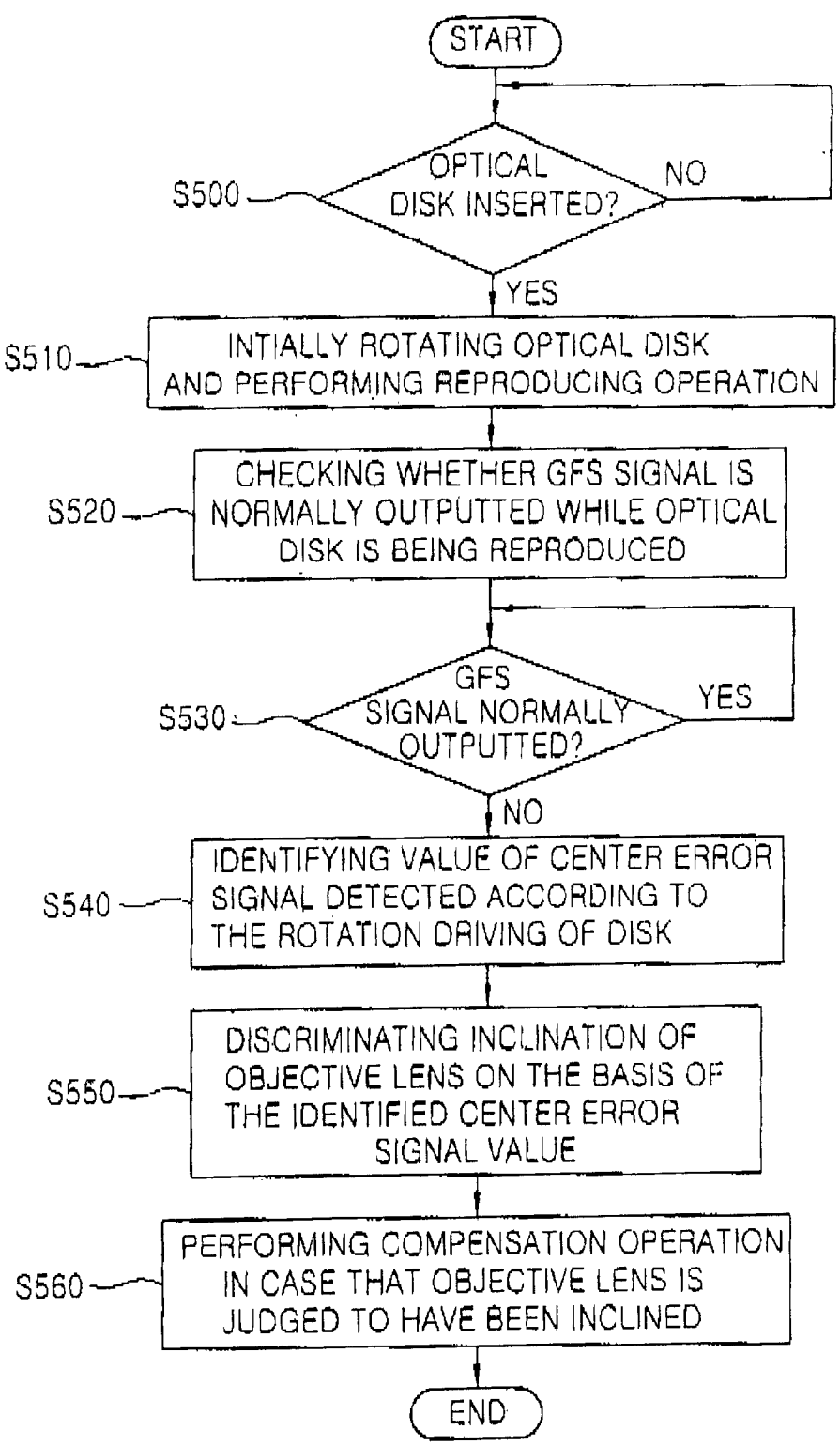
FIG. 7 is a flow chart of a method for detecting inclination of the objective lens in accordance with the present invention.

FIG. 7 is a flow chart of a method for detecting inclination of the objective lens in accordance with the present invention.

When the optical disk 100 is inserted and mounted on a tray (not shown) of the optical disk driving apparatus (S500), the digital signal processor 150 applies a driving voltage to the spindle motor (160) through the drive unit 180 to initially drive the optical disk 100, and the microcomputer 190 controls the optical pick-up so that the optical pick-up 110 travels from the current initial position along the track to detect a record signal (S510).

The center error detector 120 detects a center error (CE) signal according to the signal outputted from the photodiode 400 which receives the light reflected from the optical disk 100. The center error (CE) signal value can be obtained by subtracting the range of a beam spot received at the portion 'C' of the photodiode 400 from the range of the beam spot received at the portion 'A' of the photodiode 400.

The objective lens 200 is operated by the voltage applied to an actuator in the optical pick-up 110. Even though the objective lens 200 is distanced as far as the focussing distance from the record face of the optical disk 100, the object lens 200 can be moved within a predetermined range from a central position of the actuator, according to the tracking servo operation for moving the objective lens horizontally and the focussing servo operation for moving the objective lens vertically, so that the current track can be precisely traced to be reproduced.

The relationship between the position of the objective lens having a movement range and the center error signal will now be described with reference to FIGS. 6A through 6C.

Figure 8A:
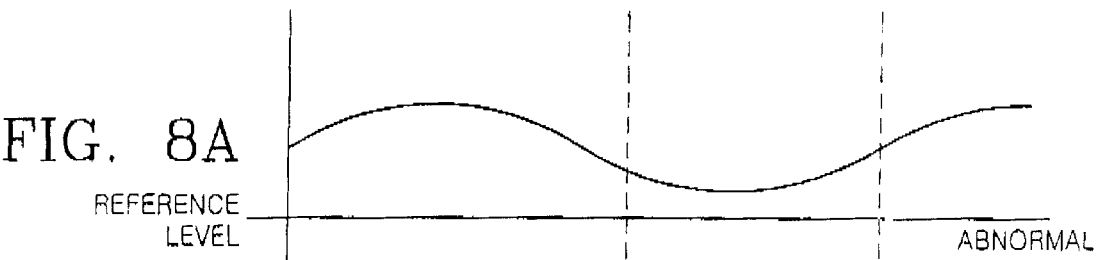
FIGS. 8A through 8C are wave forms indicating a center error signal according to position of the objective lens in the optical pick-up in accordance with the present invention.
Figure 8B:
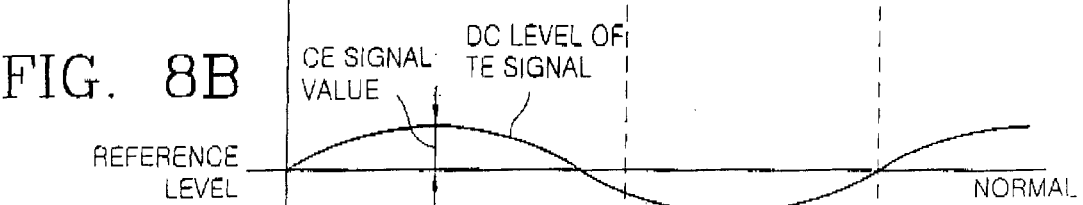
Figure 8C:
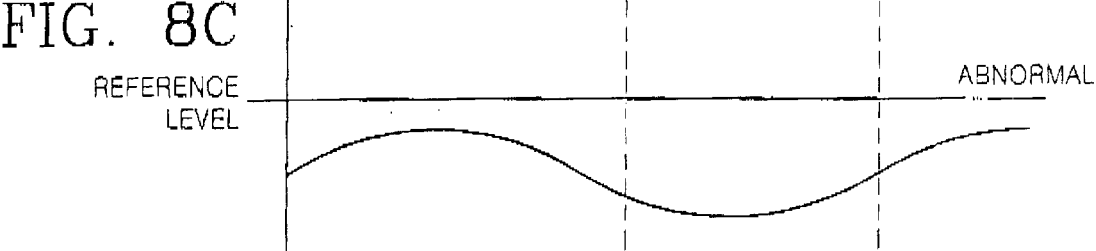

FIGS. 6A through 6C illustrate inclination relation between the optical axis and the objective lens in accordance with the present invention, and FIGS. 8A through 8C are wave forms indicating a center error signal according to position of the objective lens in the optical pick-up in accordance with the present invention.

Figure 6:
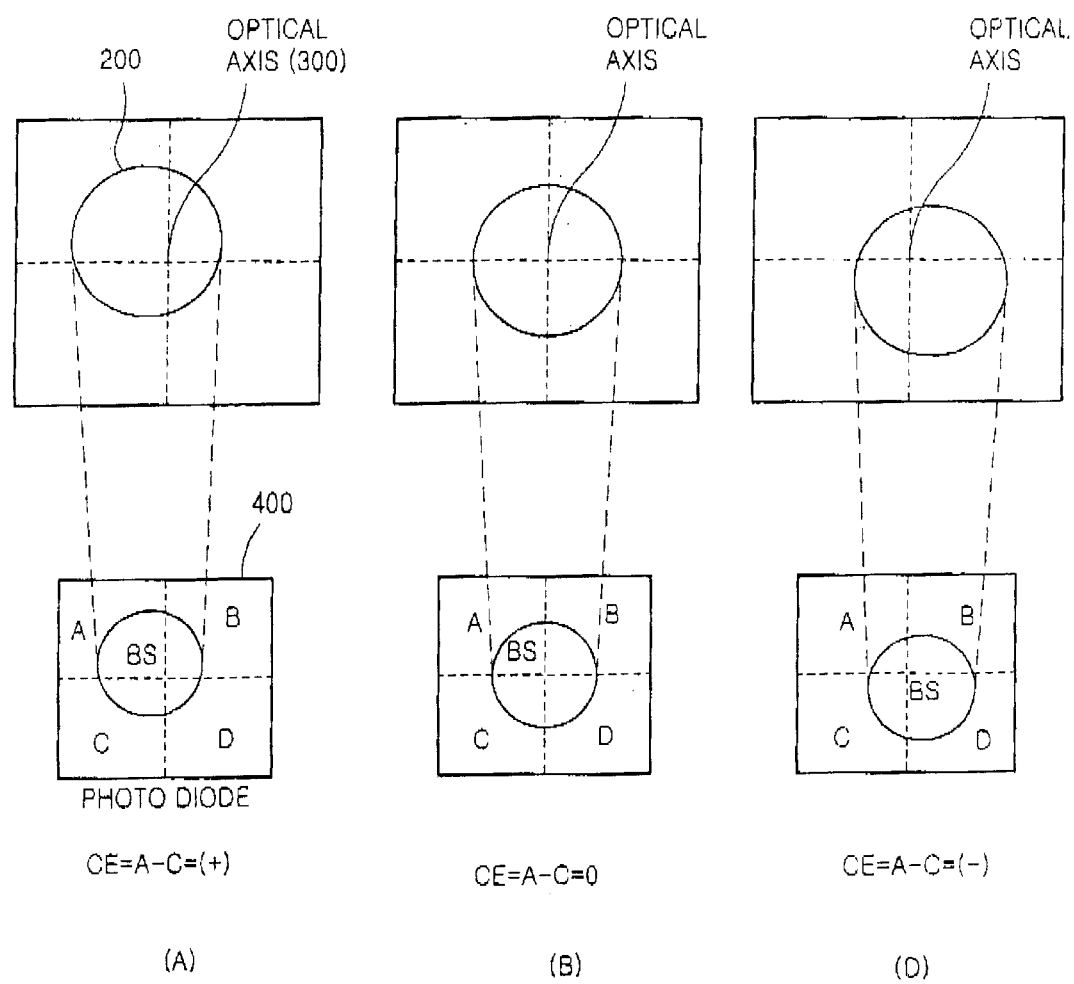
FIGS. 6A through 6C illustrate inclination relation between the optical axis and the objective lens in accordance with the present invention.

There are shown in FIG. 6 an objective lens 200 operated by the voltage applied to the internal actuator of the optical pick-up 110 and an internal photodiode PD 400 of the optical pick-up 110 for receiving the beam spot reflected on the optical disk 100 transmitting the objective lens 200.

The inclination of the objective lens is discriminated by the center error signal according to the inclination degree of the beam spot received at the portions A and C of the photodiode PD 400. When the beam spot of the photodiode PD 400 is vertical to the objective lens, the center error signal has the maximum value.

FIG. 6A illustrates a case that the record face of the optical disk 100 is eccentric downwardly from the normal position, in which the objective lens has inclined leftward from the optical axis. In this case, as shown in FIG. 7A, the center error signal value outputted from the photodiode 400 is a positive center error signal value, that is, a DC level value of the tracking error signal.

The above description can be expressed as the following equation.

$$CE=A-C=(+)(A>C) \quad (1)$$

Wherein CE is the center error signal, 'A' is the left upper portion of the photodiode and 'C' is the right low portion of the photodiode.

FIG. 6B illustrates a case that the record face of the optical disk 100 is positioned at a normal position, in which the objective lens 200 positioned at the center of the optical axis 300. In this case, as shown in FIG. 8B, the center error signal value is '0'.

The above description can be expressed by the following equation.

$$CE=A-C=0(A=C) \quad (2)$$

FIG. 6C illustrates a case that the record face of the optical disk 100 is eccentric upwardly from the normal position, in which the objective lens 200 is inclined rightward from the center of the optical axis. In this case, as shown in FIG. 8C, the center error signal value is a negative center error signal value.

The above description can be expressed by the following equation.

$$CD=A-C=(-)(A<C) \quad (3)$$

The center error signal outputted from the center error signal detector 120 is converted to a digital value by the A/D converter 130, to be outputted. The converted and outputted digital signal value is inputted to the microcomputer 190, and the microcomputer 190 continuously checks the center error signal value for one cycle, that is, the DC level value of the tracking error signal, during one cycle of the inputted digital signal value.

The RF unit 140 wave-shapes the radio frequency signal read from the optical pick-up 110 and outputs it to the digital signal processor 150. Then, the digital signal processor 150 restores the radio frequency signal to its original digital data.

The restored data is in a frame form, the basic unit. When the rotation speed of the optical disk 100 reaches a predetermined speed, a synchronous signal of the frame is detected at constant time intervals. The digital signal processor 150 continuously checks whether 8 synchronous signals are consecutively outputted for a predetermined time. When 8 synchronous signals are consecutively outputted for a predetermined time, the digital signal processor 150 generates a high value of the GFS (Good Frame Sync) signal and outputs it to the microcomputer 190.

The microcomputer 190 continuously checks whether the GFS signal outputted from the digital signal processor 150 is maintained in the high level state and normally outputted (S520).

Upon checking, if the GFS signal is not normally outputted, that is, if the GFS signal is maintained in a low level state for more than a predetermined time (S530), the microcomputer 190 discriminates whether the objective lens 200 has inclined on the basis of the center error signal value inputted from the A/D converter 130 which has been observed for one cycle (S540, S550). For more accurate judgement, several cycles may be observed.

If the average value of the center error signal values which have been continuously observed is a positive value, the microcomputer 190 judges that the objective lens 200 has inclined leftward from the optical axis.

If the average value of the center error signals is '0', the microcomputer 190 judges that the objective lens 200 is positioned at the center of the optical axis and proceeds along the center of the track of the optical disk 100.

If the average value of the center error signals is a negative value, the microcomputer 190 judges that the objective lens 200 has inclined rightward from the optical axis.

Generally, in the normal reproducing, the center error signal is outputted while making a sine wave at constant intervals. In this respect, however, if the pick-up lens inclines, the center error signal deviates from the sine wave and is outputted to one side.

In the present invention, in case that the center error signal is continuously outputted to only one side for a predetermined time, the lens is judged to incline.

If the microcomputer 190 discriminates the inclination of the objective lens 200 according to the above stated method, the microcomputer 190 performs a compensation operation for it (S560).

First, the microcomputer 190 turns off the tracking servo operation. And, as described above, it continuously observes the center error signal value to perform the center servo operation until the objective lens 200 is stabilized at the center of the track, that is, the average value of the center error signal values is '0'.

When the objective lens 200 returns to the center of the track, the microcomputer 190 turns on the tracking servo operation, so that the optical pick-up can read the data from the optical disk 100 in the stabilized state.

When the compensating operation is completed, the microcomputer 190 keeps performing the objective lens inclination detecting operation and the compensation operation until the optical disk 100 is completely driven, while observing the GFS signal and the center error signal.

The above processes will now be explained with reference to FIGS. 9 and 10.

Figure 9:
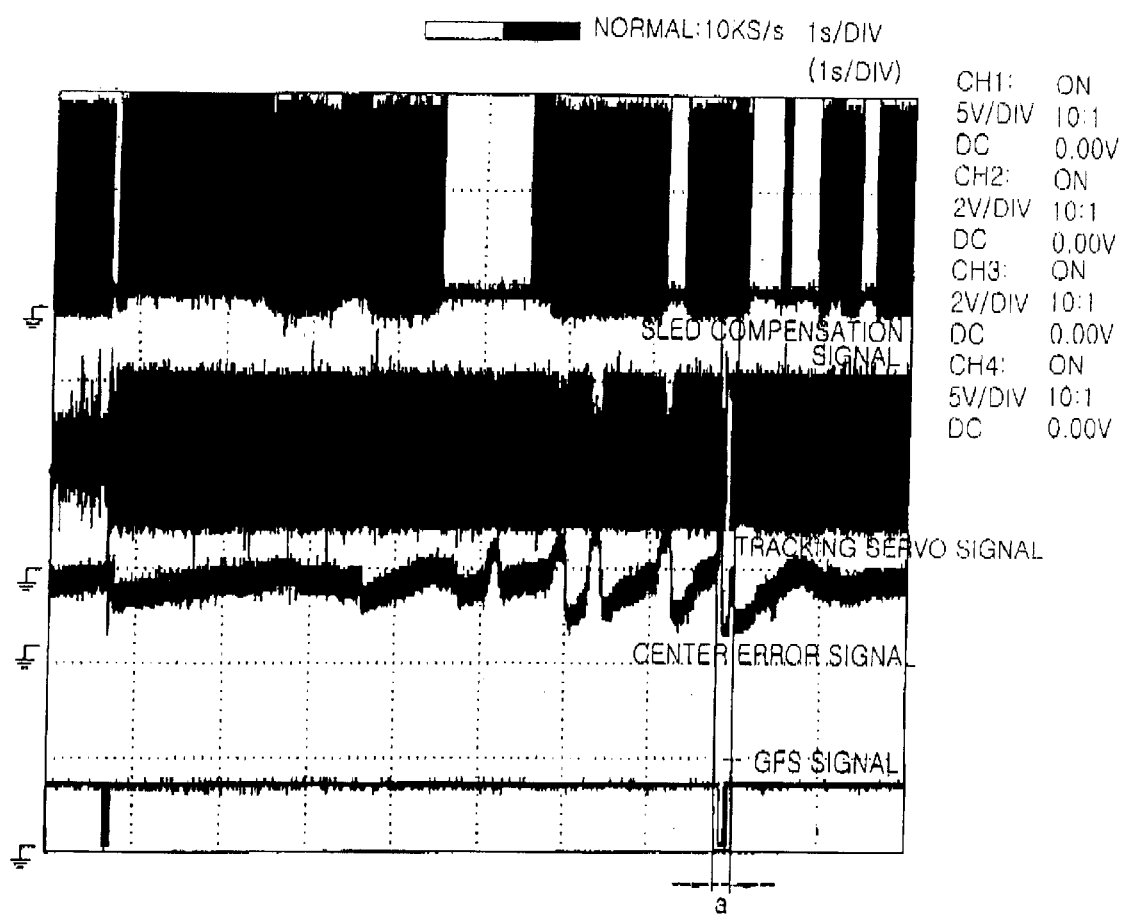
FIG. 9 illustrates wave forms in case that the objective lens is inclined from the optical axis in accordance with the present invention.
Figure 10:
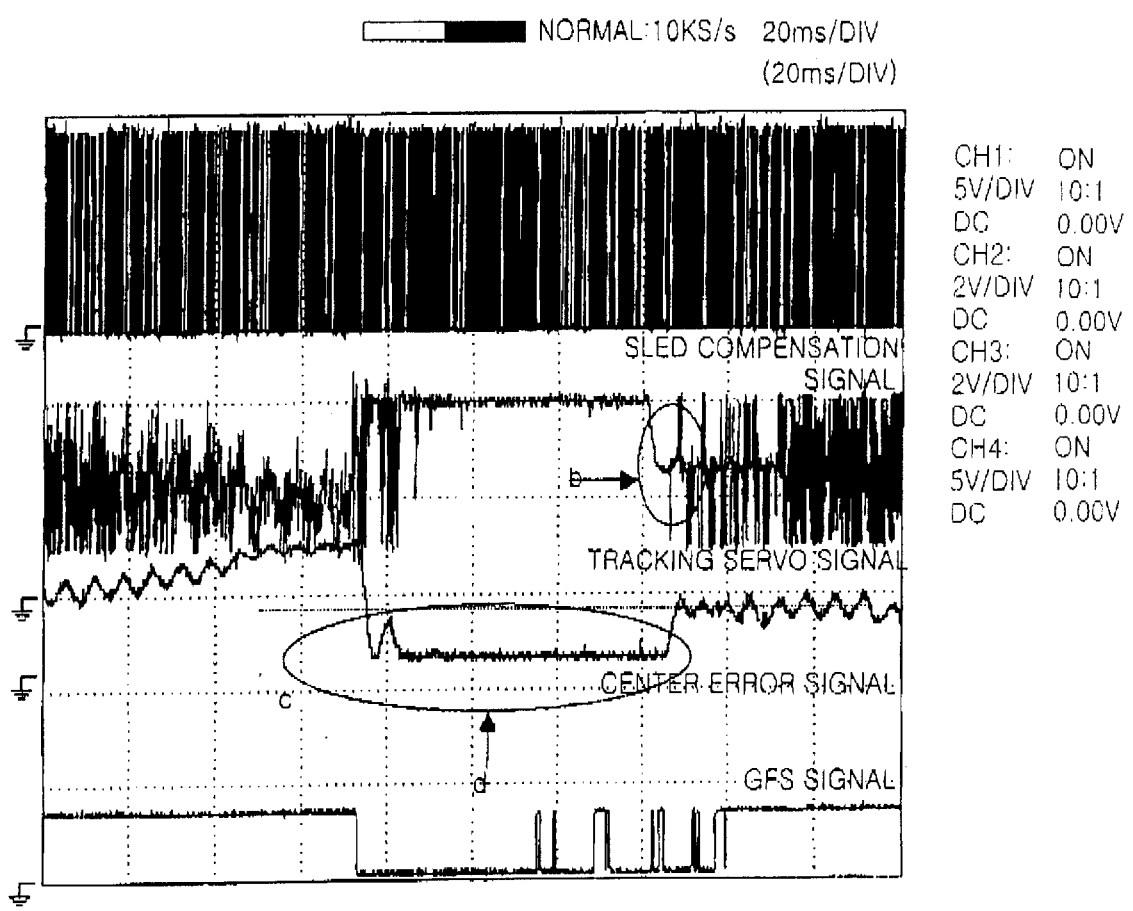
FIG. 10 illustrates enlarged wave forms of portions where the inclination of the objective lens is detected of FIG. 9 in accordance with the present invention.

FIG. 9 illustrates wave forms in case that the objective lens is inclined from the optical axis in accordance with the present invention and FIG. 10 illustrates enlarged wave forms of portions where the inclination of the objective lens is detected of FIG. 9 in accordance with the present invention.

With reference to FIG. 9, the GFS signal is not normally detected in the portion 'a' and FIG. 10 is an enlarged view of the portion 'a' of FIG. 9.

Each interval of FIG. 9 indicates Is and each interval of FIG. 10 indicates 20 ms.

When a center error signal of a wave form 'd' of FIG. 10 is inputted to the microcomputer 190, the microcomputer 190 judges that the objective lens 200 has inclined from the optical axis 300 according to the center error signal.

In order to perform compensation operation, the microcomputer adopts a center return routine such as 'b' of FIG. 10, so that the objective lens 200 returns to the center of the optical axis 300.

When the objective lens 200 returns to the optical axis, a wave form of 'c' of FIG. 10 is outputted. As shown in the drawing, less than 100 ms time is taken until the return wave form is outputted.

Figure 1:
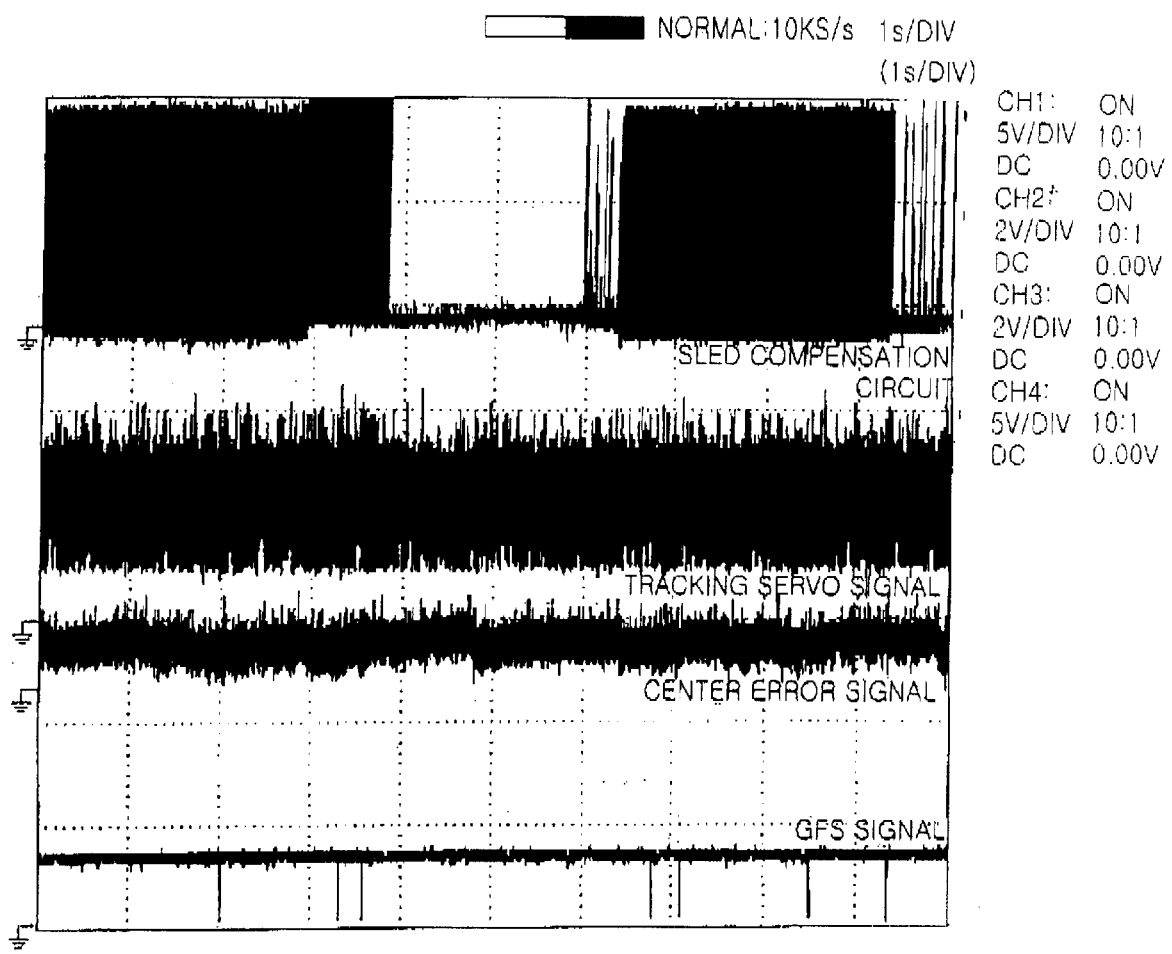
FIG. 1 illustrates wave forms indicating signals according to a process that an objective lens returns to an optical axis in accordance with a conventional art.
Figure 2:
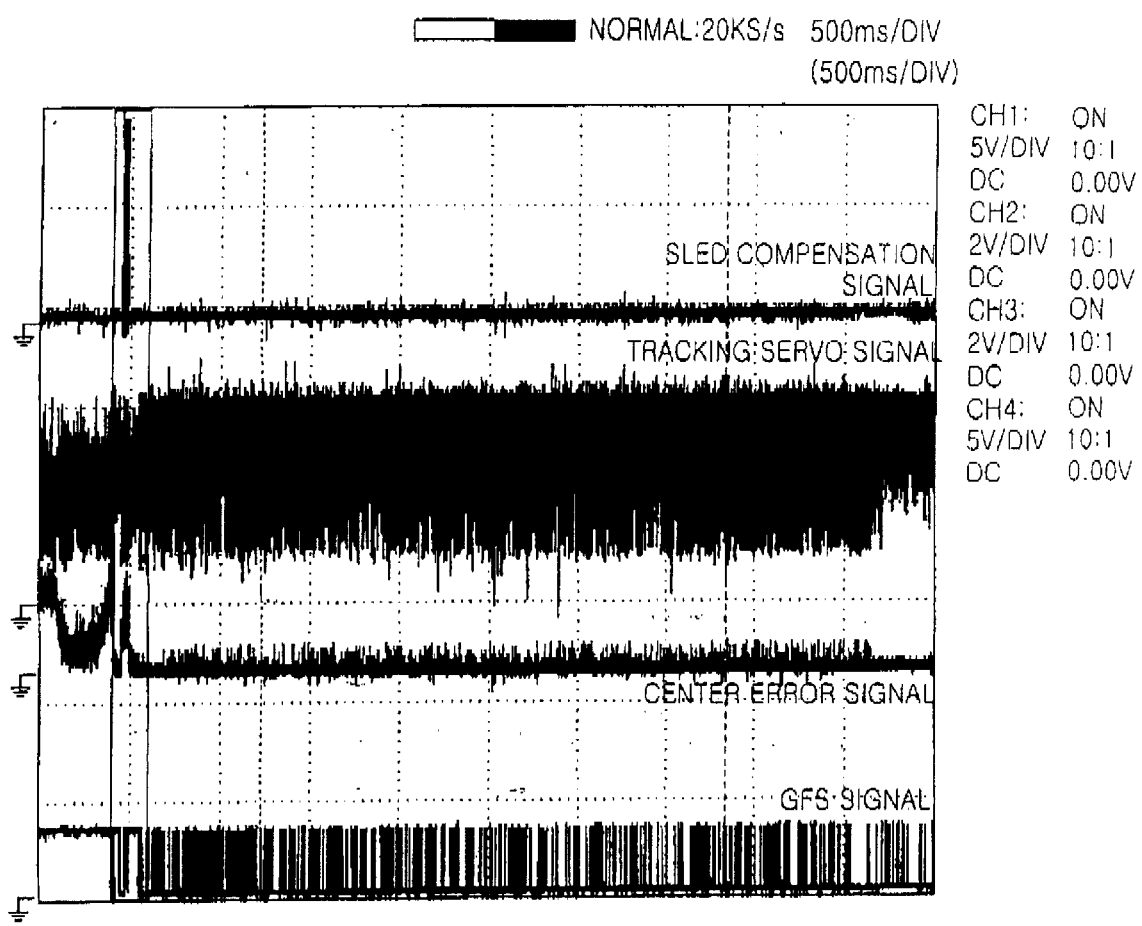
FIG. 2 illustrates wave forms indicating a center error signal and a GFS signal generated when the objective lens is inclined to a side in accordance with the conventional art.
Figure 3:
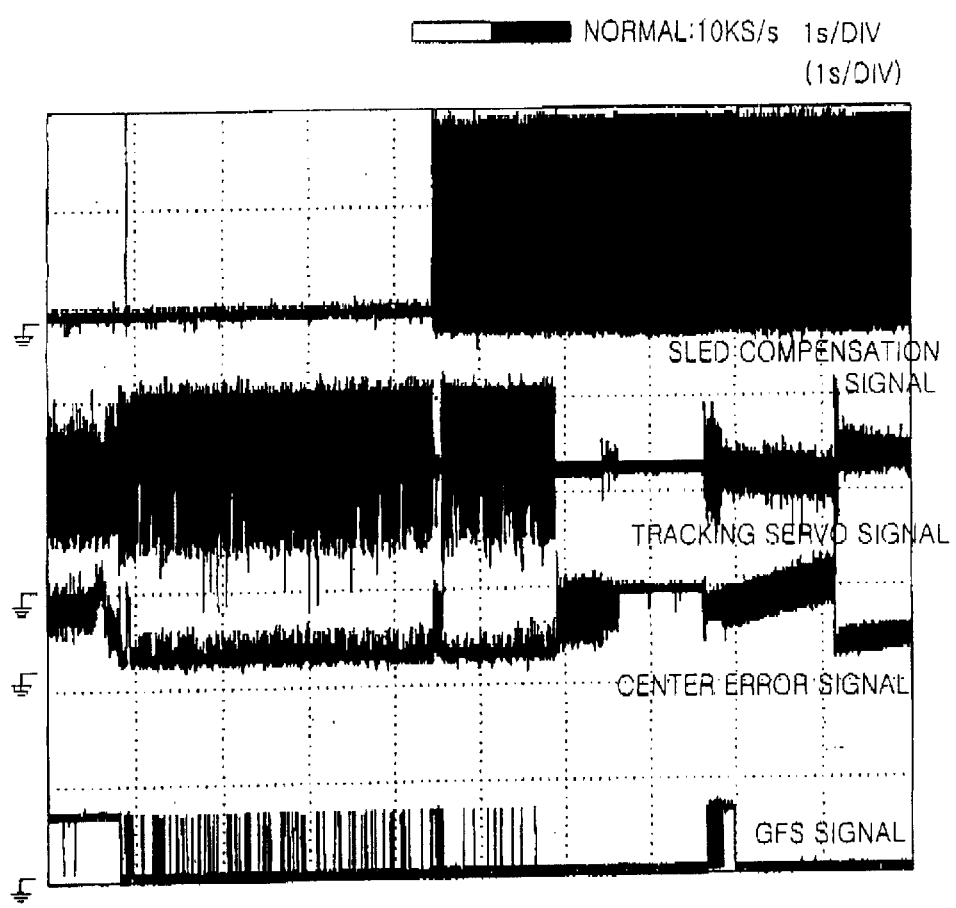
FIG. 3 illustrates wave forms indicating signals according to a process that the objective lens returns to the optical axis in accordance with the conventional art.
Figure 4:
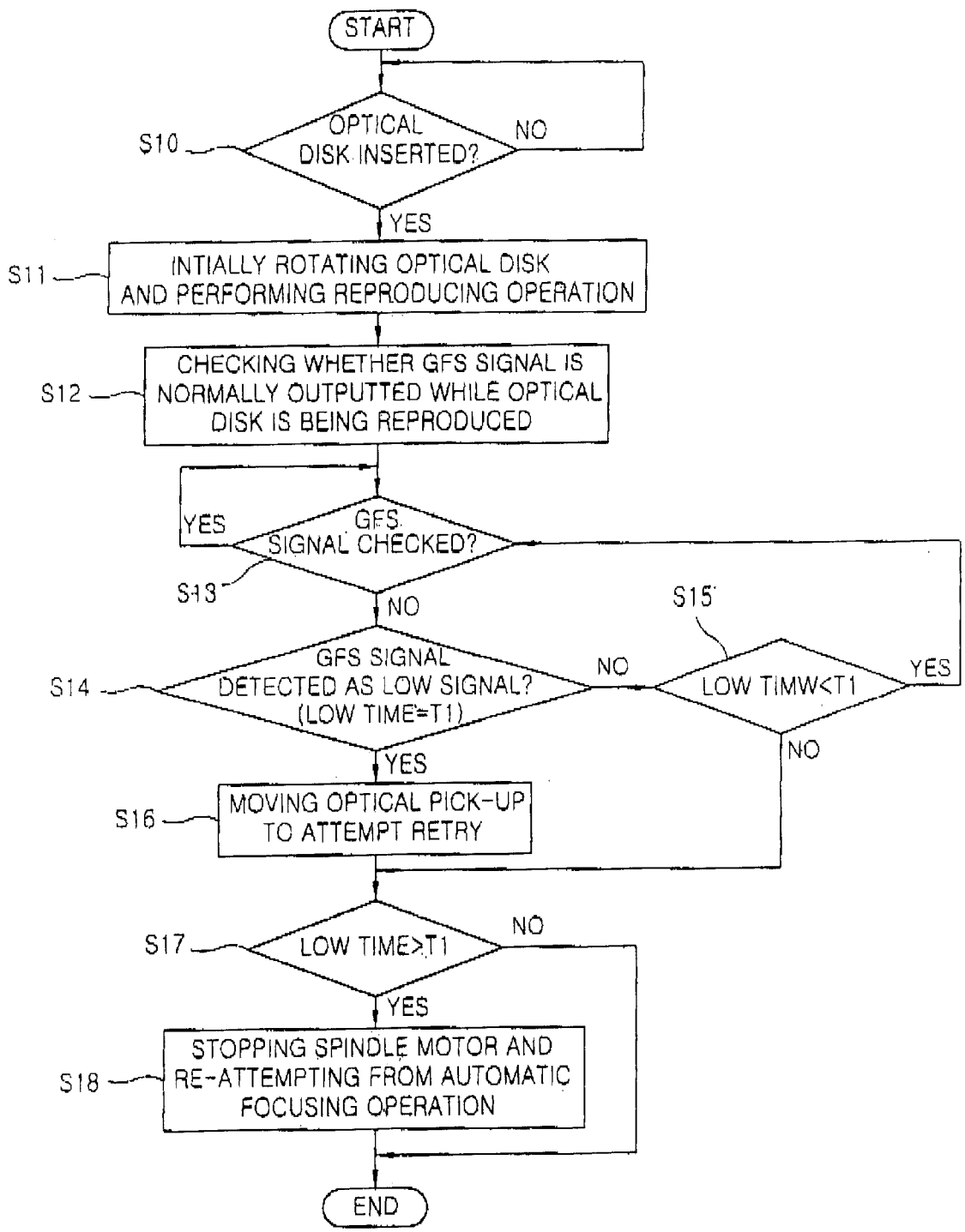
FIG. 4 is a flow chart of a method for detecting inclination of the objective lens in accordance with the conventional art.

Thus, in comparison with the conventional method for controlling the objective lens by detecting inclination of the objective lens using the GFS signal as shown in FIG. 3, the objective lens can return to the center quickly and can be precisely controlled in the present invention.

As so far described, according to the present invention, in order to discriminate and compensate inclination of the objective lens by the optical disk driving apparatus, the GFS signal and the center error signal generated according to the rotation of the optical disk are all taken into consideration, so that the inclination of the objective lens in the optical pick-up is accurately and quickly discriminated. Thus, any malfunction caused due to the inclination of the objective lens can be restored within a short time (especially within 100 ms) to perform the normal operation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for detecting inclination of an objective lens comprising the steps of:

initially rotating an optical disk and detecting a record signal while tracing on the track of the optical disk;

checking whether a frame synchronous signal according to the rotation of the optical disk is normally detected;

checking a center error signal value outputted from the optical pick-up which reads a record data on the optical disk in case that the frame synchronous signal is abnormally detected; and judging inclination of the objective lens on the basis of the frame synchronous signal and the checked center error signal value.

2. The method of claim 1, wherein the checking step includes detecting a GFS (Good Frame Sync) signal is generated when the frame synchronous signals are consecutively detected during the correct timing.

3. The method of claim 2, wherein if the frame synchronous signal is normally detected, the GFS signal is outputted as a high level signal.

4. The method of claim 1, wherein if the frame synchronous signal is normally detected, the data recorded on the optical disk is read along the track of the optical disk.

5. The method of claim 1, wherein the judging step includes judging that the objective lens is inclined leftward or rightward from the optical axis when the average value of the center error signal values is a positive or negative.

6. The method of claim 1, wherein the judging step includes judging that the objective lens is inclined from the optical axis when if the center error signal value is outputted only at one side for a predetermined time.

7. The method of claim 1, further comprises performing the step to return the objective lens to the center of the track of the optical disk when the inclination of the objective lens is judged by the center error signal.

8. The method of claim 7, wherein the step of performing compensation operation to return the objective lens to the center of the track of the optical disk, comprising the steps of:

turning off the tracking servo operation of the optical pick-up;

outputting a center return routine to the optical pick-up; performing a servo operation while observing the center error signal values until the objective lens returns to the center of the track of the optical disk; and turning on the tracking servo operation when the objective lens returns to the center of the track of the optical disk.

9. An apparatus for detecting inclination of an objective lens comprising:

an optical pick-up for reading a data recorded on the optical disk;

a spindle motor for rotating the optical disk;

a sled motor for moving the optical pick-up horizontally;

a drive unit for driving the spindle motor and the sled motor;

a detector for detecting a center error signal from an output signal of the optical pick-up;

an RF unit for generating a servo error signal and a reproduction RF signal on the basis of the signal read by the optical pick-up;

a digital signal processor for outputting a reproduction data according to the signal outputted from the RF unit, controlling the drive unit and outputting a synchronous signal; and a controller for judging whether the objective lens included in the optical pick-up has inclined according to the synchronous signal outputted from the digital signal processor and the center error signal outputted from the detector.

10. The apparatus of claim 9, further comprising an A/D converter for converting the signal outputted from the center error signal detector to a digital signal.

11. The apparatus of claim 9, wherein the controller judges that the objective lens is judged to be inclined from the optical axis when the center error values are outputted only at one side for a predetermined time.

12. An apparatus for controlling an inclination of an objective lens comprising:

an optical pickup to read data recorded in a disk, said optical pickup including the objective lens;

a detection unit to detect a signal representing that a frame synchronous signal is normally detected and a center error signal representing a deviation from axial center generated from the optical pickup; and a controller to control the optical pickup to compensate the deviation from axial center based on the detected center error signal when the detected signal represents that the frame synchronous signal is abnormally detected.

13. The apparatus of claim 12, wherein the detection unit detects the center error signal based on the photodiode components that are vertical from optical axis.

14. The apparatus of claim 12, wherein the detection unit detects the signal and the center error signal when normal reproduction.

15. The apparatus of claim 12, further comprising an A/D converter to convert the center error signal outputted from the detection unit to a digital signal.

16. The apparatus of claim 12, wherein the controller judges that the objective lens is deviated from the optical axis when the center error values are outputted only at one side for a predetermined time.

17. A method for controlling an inclination of objective lens, comprising the steps of:

detecting a signal representing that a frame synchronous signal is normally detected a center error signal representing a deviation from axial center generated from the optical pickup; and controlling the objective lens to compensate the deviation from the axial center based on the detected error signal when the detected signal represent that the frame synchronous signal is abnormally detected.

18. The method of claim 17, wherein detecting step includes the step of detecting the center error signal based on the photodiode components that are vertical from optical axis.

19. The method of claim 17, wherein the controlling includes the step of:

turning off a tracking servo operation of the optical pick-up;

outputting a center return routine to the optical pick-up;

performing a servo operation while observing the center error signal values until the objective lens returns to the center of the track of the optical disk; and turning on the tracking servo operation when the objective lens returns to the center of the track of the optical disk.

* * * * *